United States Patent [19]

Verton et al.

[11] Patent Number: 4,535,500
[45] Date of Patent: Aug. 20, 1985

[54] CONNECTING DEVICE FOR WIPER BLADES

[75] Inventors: José Verton, Saint-Vincent; Alain Henrion, Saint-Mard, both of Belgium

[73] Assignee: Champion Spark Plug S.A., Diegem, Belgium

[21] Appl. No.: 619,885

[22] Filed: Jun. 12, 1984

[30] Foreign Application Priority Data

Jun. 27, 1983 [FR] France ............... 83 10575

[51] Int. Cl.[3] .................. B60S 1/32; B60S 1/40
[52] U.S. Cl. ..................... 15/250.23; 15/250.32
[58] Field of Search ........... 15/250.23, 250.21, 250.31, 15/250.32, 250.35

[56] References Cited

U.S. PATENT DOCUMENTS 3,076,991 2/1963 Macherson ............... 15/250.23
3,893,204 7/1975 Kolb ..................... 15/250.23

FOREIGN PATENT DOCUMENTS 2022210 12/1971 Fed. Rep. of Germany ... 15/250.32
2830507 1/1980 Fed. Rep. of Germany ... 15/250.32

*Primary Examiner*—Peter Feldman
*Attorney, Agent, or Firm*—Wood, Dalton, Phillips, Mason & Rowe

[57] ABSTRACT

A pantograph-type windshield wiper system is provided with a unique and novel connector which permits rotatable movement about two transverse axes. In particular, the connector permits a removable connection of a pantograph-type arm to a conventional cross-pin type blade and maintains a low profile relative to the windshield. The connector is assembled with the cross-pin of the blade (which cross-pin provides one rotative axis) and with a depending pin on the arm end (which pin provides the second rotative axis). The depending pin on the arm removably locks the connector on the cross-pin.

10 Claims, 15 Drawing Figures

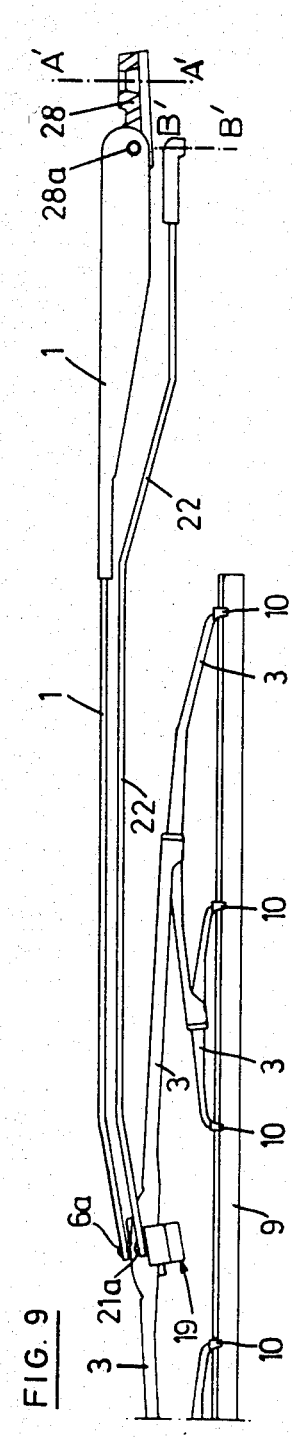
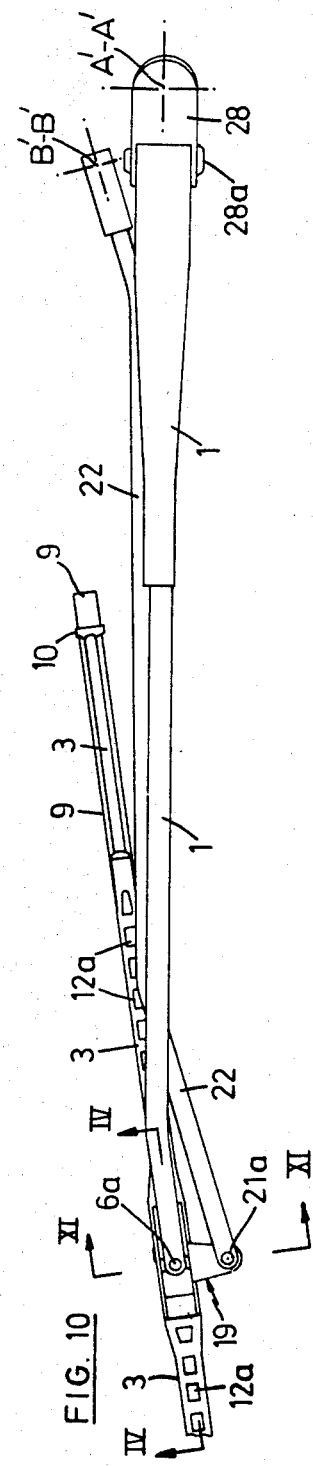
FIG. 9
FIG. 10

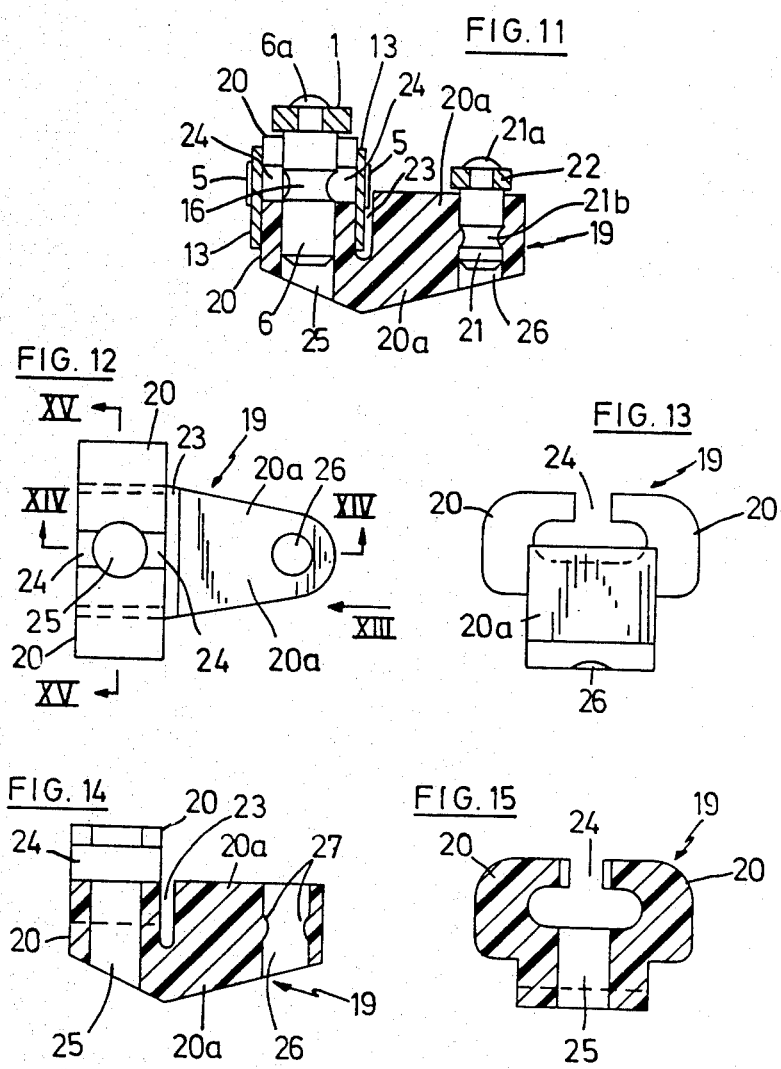

CONNECTING DEVICE FOR WIPER BLADES

TECHNICAL FIELD

The present invention relates to a connecting device for connecting a wiper blade to a wiper arm and more particularly to a connecting device for a pantograph type arm system wherein the blade rotates about two axes extending transverse to each other.

BACKGROUND OF THE PRIOR ART

In most known pantograph arm wiper systems the wiper blade had to be especially designed for this purpose, i.e. one of the rods of the pantograph was rigidly secured to the medium portion of the superstructure of the wiper blade and the evident drawback was that wiper blades which were designed for pantograph arms could not be used with conventional wiper arms. The result was an increase of the stocks in the warehouses of the manufacturers and of the dealers.

In other known pantograph arm wiper systems the pivot axis which is perpendicular to the windshield, and about which the wiper blade must be capable of rotating, is formed by a pin which is rigidly attached to the medium portion of the superstructure of the wiper blade and, therefore, has the same drawback as the one mentioned in the preceding paragraph.

Generally speaking a disadvantage of all the known pantograph arm wiper systems is that their total height above the windshield is too great. Said height is very important in all the cases where, in its rest position, the whole wiper system is located beneath the hood of the vehicle. In such circumstances each millimeter is of importance.

U.S. Pat. No. 3,893,204 and German (DE) Patent Application No. 28 30 507 show pantograph arm wiper systems wherein the wiper blade no longer has to be especially designed for use with a pantograph arm, thus eliminating the above mentioned stocking problems.

However, the two systems described in these documents have the disadvantage that even if the pantograph arm can be easily dismounted from the wiper blade this is not true for dismounting the connecting device or connector from the pantograph arm. Indeed this can only be done practically by destroying one or the other part of the arm/connector assembly.

The major disadvantage of said two systems is their relatively prominent or excessive height above the windshield, height which is due to the fact that the two arms of the pantograph are located not only one above the other, but also both above the superstructure of the wiper blade.

Another disadvantage of most known pantograph arm wiper systems is the fact that if the wiper blade is not symmetrical with respect to its transverse medium plane it is necessary to manufacture one wiper blade for the left hand drive vehicles and a modified one for the right hand drive vehicles. Indeed in one case the rod of the pantograph which is rigidly attached to the superstructure of the wiper blade is located on one side of the blade and in the other case said rod of the pantograph is located on the other side of the blade.

DISCLOSURE OF THE INVENTION

The present invention relates to a connecting device for connecting a wiper blade to a wiper arm wherein the wiper blade is capable of rotating about a first pivot pin attached to the wiper arm and about a second pivot pin attached to the superstructure of the wiper blade and extending substantially perpendicularly with respect to the first pivot pin.

Such devices are for example used on motor vehicles and more specifically in the wiper systems which comprise what is commonly called a pantograph arm. One of the embodiments of the device according to the invention can, however, also be used in a wiper system which does not comprise a so called pantograph arm, but of which the wiper blade wipes a surface which is identical to or similar to the one obtained with a pantograph arm.

The connecting device according to the invention eliminates all the disadvantages of the above mentioned known pantograph systems and its first object is to provide a pantograph arm wiper system (or similar) of which the total height above the windshield is minimal, i.e. substantially less than in the known pantograph systems.

A second object of the invention is to provide a pantograph arm wiper system (or similar) wherein not only the wiper blade, but also the arm(s) of the system may be easily mounted onto or dismounted from the body of the connecting device, the body of the connecting device being what is commonly called a connector, i.e. the intermediate part which links a wiper blade to the wiper arm.

A third object of the invention is to provide a pantograph arm wiper system (or similar) which permits the use of wiper blades designed for conventional arms, independently of the fact that these wiper blades are symmetrical or not with respect to their transverse medium plane.

A fourth object of the invention is to provide a pantograph arm wiper system (or similar) which may be used indifferently on left hand and right hand drive vehicles, without modifying the properly so called blade/arm connecting device.

The connecting device according to the invention is substantially characterized by the fact (a) that the body of the device comprises a seat for the first pivot pin which has the form of a straight circular cylinder and a seat for the second pivot pin which has the form of a T or L-shaped straight cylinder and (b) that the first pivot pin of the device includes an annular recess capable of cooperating with the second pivot pin.

A second embodiment of the connecting device according to the invention is furthermore substantially characterized by the fact (a) that the body of the connecting device comprises two portions, the first of said two portions being located between the two side walls of the superstructure of the wiper blade and the second of said two portions being located laterally with respect to said two side walls and (b) that the second portion of the device comprises a seat for a third pivot pin, said seat having substantially the form of a straight circular cylinder and being provided with retention means for retaining said third pivot pin.

The invention will be better understood when reading the following portions of the specification in conjunction with the drawings.

BRIEF DESCRIPTION OF THE DRAWINGS

FIG. 9 is an elevational view of a pantograph arm wiper system wherein the connecting device according to the second embodiment of the invention is used;

FIG. 10 is a top view of the wiper system of FIG. 9;

FIG. 11 is a section along line XI—XI of the wiper system of FIG. 10;

FIG. 12 is a top view of the body of the connecting device according to the second embodiment of the invention;

FIG. 13 is an elevational view along arrow XIII of the connecting device of FIG. 12;

FIG. 14 is a section along line XIV—XIV of the connecting device of FIG. 12; and FIG. 15 is a section along line XV—XV of the connecting device of FIG. 12.

BRIEF DESCRIPTION OF PREFERRED EMBODIMENT

Figure 1:
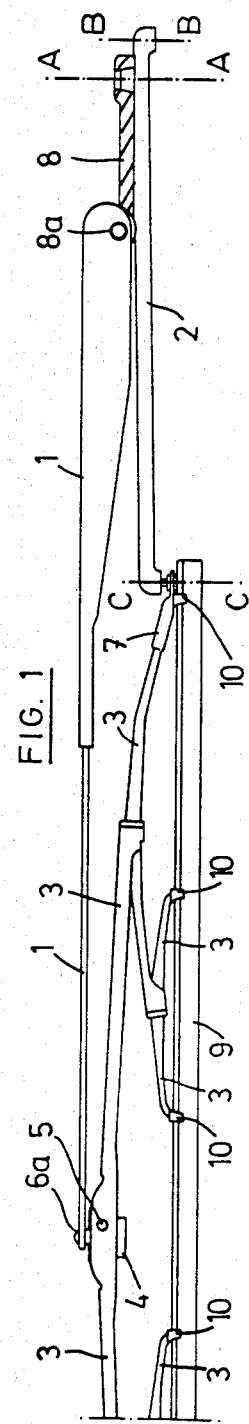
FIG. 1 is an elevational view of a wiper sysem, similar to a pantograph arm wiper system, wherein the connecting device according to the first embodiment of the invention is used.
Figure 2:
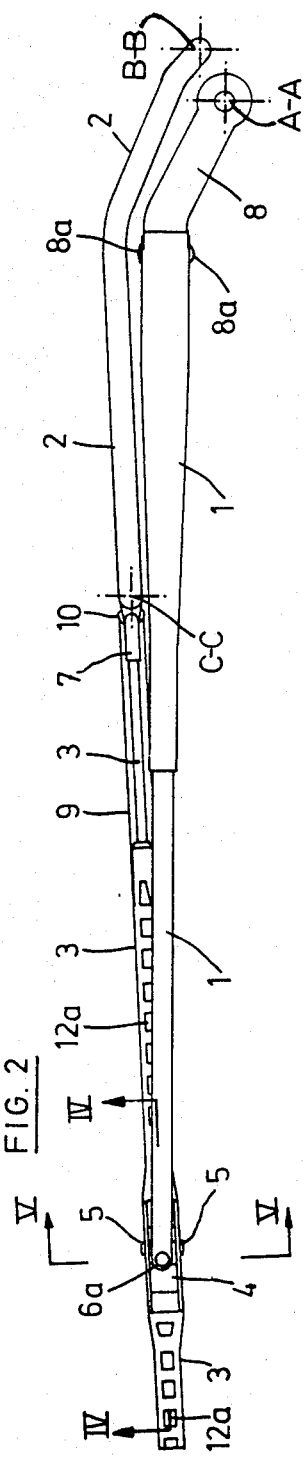
FIG. 2 is a top view of the wiper system of FIG. 1.

FIGS. 1 and 2 show a wiper assembly wherein the first embodiment of the connecting device according to the invention is used. This system comprises:

a wiper blade consisting of a superstructure 3 and of a wiping element 9 having the claws 10 linked to the superstructure 3;

a wiper arm 1 (main arm), of which the free end portion is attached to the superstructure 3 of the wiper blade by means of the body 4 of the connecting device according to the invention and of which the other extremity can rotate about an axis 8a, which is part of an element 8, which in turn can rotate about the axis A—A in dragging along the arm 1; and an auxiliary arm 2 (control arm) of which one of the extremities is capable of rotating about the axis C—C, which is secured to the superstructure 3 of the wiper blade by means of part 7, and of which the other extremity is capable of rotating about the axis B—B which by means of an appropriate part (not shown) is capable of rotating about the axis A—A.

FIGS. 3 through 8 show, at a larger scale, the different elements of the first embodiment of the connecting device according to the invention.

Figure 3:
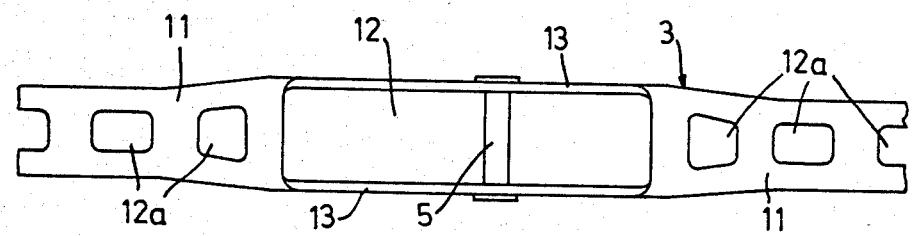
FIG. 3 is a partial top view of the medium portion of the superstructure of a conventional wiper blade.

FIG. 3 is a top view of the medium portion of the superstructure 3 of the wiper blade. The transverse section of the superstructure 3 has, at least in this portion, substantially the form of an inverted U and consequently comprises two flanges or side walls 13 and a web 11. At the center of this medium portion of the superstructure 3 there is provided a large opening 12 in the web 11 and the two side walls 13 are linked together in this area by the rivet or pivot pin 5 onto which will be mounted, as explained hereunder, the body 4 of the connecting device according to the invention. The web 11 of the superstructure 3 is furthermore provided with a series of smaller openings 12a of which one of the objects is the reduction of the weight of said superstructure.

Figure 4:
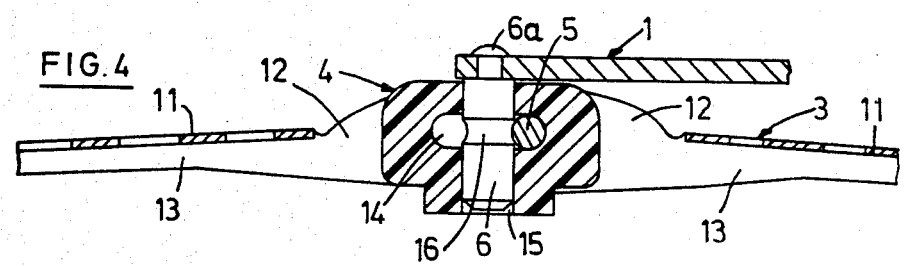
FIG. 4 is a partial section along line IV—IV of the wiper system of FIG. 2.
Figure 5:
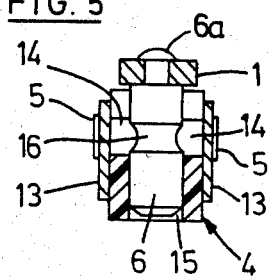
FIG. 5 is a section along line V—V of the wiper system of FIG. 2.
Figure 6:
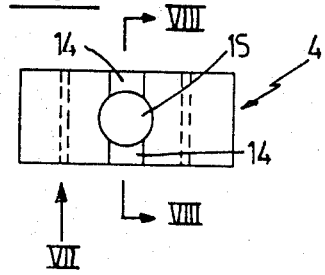
FIG. 6 is a top view of the body of the connecting device according to the first embodiment of the invention.
Figure 7:
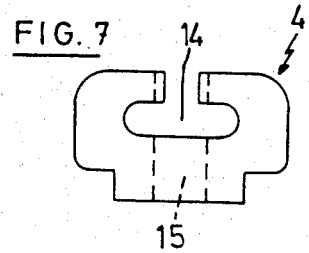
FIG. 7 is an elevational view along arrow VII of the body of the connecting device of FIG. 6.
Figure 8:
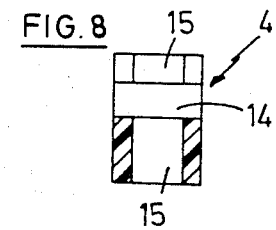
FIG. 8 is a section along line VIII—VIII of the body of the connecting device of FIG. 6.

FIGS. 4 and 5 show the body 4 (i.e. the properly so called connector) of the connecting device mounted on the superstructure 3 and on the main arm 1 whilst FIGS. 6 through 8 show different views and sections of the body 4 taken separately.

As can be seen in FIGS. 4 and 5, a pivot pin 6 is riveted (6a) to the main arm 1. This pivot pin comprises an annular recess 16 of which the section according to an axial plane is such that it corresponds to the (circular) curvature of the transverse section of the rivet or pivot pin 5. In the following portions of the specification and in the claims, the pivot pin 6 of the arm 1 will be considered as being the "first pivot pin", whilst the rivet or pivot pin 5 of the superstructure 3 will be considered as being the "second pivot pin". When the connecting device is in its working position the two above defined pivot pins 5,6 are substantially perpendicular, one with respect to the other.

The body 4 of the connecting device according to the first embodiment comprises a seat 15 for the first pivot pin 6 which has the form of a straight circular cylinder and a seat 14 for the second pivot pin 5 which has the form of a T-shaped straight cylinder. Just like the two pivot pins 5,6, the two corresponding seats 14,15 are substantially perpendicular, one with respect to the other.

When mounting the wiper blade 3,9 onto the main arm 1, the body 4 of the connecting device is pushed from beneath onto second pivot pin 5 in inserting the pin 5 into its T-shaped seat 14, i.e. in moving the body 4 of the connecting device first upwards and then sidewards, either to the right or to the left (in the figures). The pivot pin 6 of the main arm 1 is then inserted from above into its seat 15 until the annular recess 16 snaps onto the pivot pin 5 of the superstructure 3 of the wiper blade. The wiper blade 3,9 is now connected to the main arm 1 and it may rotate or rock about the pivot pin 6 of the arm 1 as well as about the geometrical axis of its rivet or pivot pin 5.

It is to be noted that the snapping of the pivot pin 6 onto the pivot pin 5 is possible because of the resilience of the body 4 of the connecting device which is made of an appropriate plastic material.

When compared to similar known connecting devices, the device disclosed above has the advantage to be very simple, very compact and thus very economical. With respect to the known connecting devices wherein the pivot pin, which is substantially perpendicular to the windshield, is rigidly secured on top, i.e. to the web of the superstructure of the wiper blade, the device according to the invention has the important advantage that the total height of the assembly arm/blade above the windshield is substantially lower.

FIGS. 9 and 10 show a wiper system with a properly so called pantograph arm wherein the second embodiment of the connecting device according to the invention is used. This system comprises:

a wiper blade consisting of a superstructure 3 and of a wiping element 9 having the claws 10 linked to the superstructure 3;

a first wiper arm 1 (main arm), of which the free end portion is attached to the superstructure 3 of the wiper blade by means of the body 19 of the connecting device according to the invention, and of which the other extremity is capable of rotating about an axis 28a, which is part of an element 28, which in turn can rotate about the axis A'—A' in dragging along the arm 1;

an auxiliary arm 22 (control arm), of which one of the extremities is linked to the portion 20a (FIG. 11) of the body 19 of the connecting device according to the invention, and of which the other extremity can rotate about the axis B'—B' which, by means of an appropriate part (not shown), is capable of rotating about the axis A'—A'.

FIGS. 11 through 15 show, at a larger scale, the different elements of the second embodiment of the connecting device according to the invention. FIGS. 11-15 should be considered in association with FIGS. 3 and 4, which make up the two embodiments of the device.

The body 19 of the connecting device according to the second embodiment comprises two portions. A first portion 20, which is exactly the same as the body 4 of the device according to the first embodiment, is located between the flanges or side walls 13 of the superstructure 3 of the wiper blade. A second portion 20a is located laterally with respect to said side walls 13 and has a slot 23 parallel to the superstructure 3 of the wiper blade. The slot 23 receives one of the side walls 13 of said superstructure 3.

The assembly of the wiper blade and of the main arm 1 is executed in exactly the same manner as for the first embodiment. The body 19 of the device is pushed from beneath onto the pivot pin 5 in inserting said pin (or rivet) into its T-shaped seat 24, i.e. in moving the body 19 first upwards and then sidewards (in the figures). The pivot pin 6 of the main arm 1 is then inserted from above into its seat 25 until the annular recess 16 snaps onto the pivot pin 5 of the superstructure 3 of the wiper blade.

The auxiliary arm 22 (control arm) guides and limits the rotational movement of the wiper blade 3,9 about the pivot pin 6 of the arm 1 and is provided with a third pivot pin 21 which is riveted (21a) to said arm 22 and which comprises an annular recess 21b. For mounting the arm 22 onto the body 19 of the connecting device, the pivot pin 21 is inserted from above into the cylindrical seat 26 until the annular recess 21b snaps onto the resilient annular collar 27 provided in said seat 26.

The two arms 1,22 are thus rotatably connected to the body 19 of the connecting device according to the invention and the wiper blade 3,9 may rotate or rock about the pivot pin 6 of the arm 1 as well as about the geometrical axis of its rivet or pivot pin 5.

For example, when compared with the connecting devices disclosed in the U.S. Pat. No. 3,893,204 and in the German (DE) Patent Application No. 28 30 507, wherein the two arms are not only located one above the other, but also both above the superstructure of the wiper blade, the connecting device according to the second embodiment has again the important advantage that the total height of the arm/blade system above the windshield is substantially smaller.

Two embodiments of the invention have thus been described. With respect to the prior art, these two embodiments have one or the other, or all the following advantages:

simple, compact, economical construction;

the body 4,19 of the connecting device can easily be mounted onto and dismounted from not only the wiper blade 3,9 but also from the arms 1,22;

wiper blades designed for conventional arms may be used with pantograph arms;

possibility to be used on pantograph arm wiper systems of left hand and right hand drive vehicles; and small total height of the arm/blade system above the windshield.

It is to be noted that the embodiments described above are not the only ones which fall within the scope of the present invention. Indeed, other variants can be easily imagined, such as for example:

It is not indispensable that the pivot pin 5 be a properly so called rivet. Any materialization of an axis of rotation will be an equivalent.

Instead of the T-shaped seat, an L-shaped seat may be provided for the second pivot pin 5;

It is not indispensable that the arms 1,22 be located above the body 4,19 of the connecting device. Indeed, in mounting the body 4,19 of the connecting device from above onto the rivet 5, the pivot pin 6,26 of the arms 1,22 will be inserted from beneath into their respective seats 25,26.

We claim:

1. A connecting device (4,5,6,19,5,6) for connecting a wiper blade (3,9) to a wiper arm (1), wherein the wiper blade (3,9) is capable of rotating about a first pivot pin (6) attached to the wiper arm (1) and about a second pivot pin (5) attached to the superstructure (3) of the wiper blade (3,9) and extending substantially perpendicularly with respect to the first pivot pin (6) characterized in that:

the body (4,19) of the device comprises a seat (15,25) for the first pivot pin (6) which has the form of a straight circular cylinder and a seat (14,24) for the second pivot pin (5) which has the form of a T or L-shaped straight cylinder; and the first pivot pin (6) of the device includes an annular recess (16) capable of cooperating with the second pivot pin (5).

2. A device according to claim 1, characterized in that the straight circular cylinder (15,25) extends substantially perpendicularly with respect to the T or L-shaped straight cylinder (14,24).

3. A device according to claim 2 wherein the superstructure (3) of the wiper blade (3,9) comprises, at the location of the second pivot pin (5), two side walls (13) separated by an opening (12) provided in said superstructure (3), characterized in that the body (4) of the device is placed on the second pivot (5) between the two side walls (13) of the superstructure (3) of the wiper blade (3,9).

4. A device according to claim 2 wherein the rotational movement of the wiper blade (3,9) about the first pivot pin (6) is guided and limited by an appropriate device, characterized in that said appropriate device consists of an auxiliary wiper arm (2) of which one of the extremities is rotatably attached to the superstructure (3) of the wiper blade (3,9).

5. A device according to claim 3, characterized in that the body of the device comprises two portions (20,20a), the first of said two portions (20) being located between the two side walls (13) of the superstructure (3) of the wiper blade (3,9) and the second of said two portions (20a) being located laterally with respect to said two side walls (13).

6. A device according to claim 5, characterized in that the second portion (20a) of the device comprises a seat (26) for a third pivot pin (21), said seat (26) having substantially the form of a straight circular cylinder and being provided with retention means (27) for retaining said third pivot pin (21).

7. A device according to claim 6, characterized in that the means for retaining the third pivot pin (21) in its seat (26) is a resilient annular collar (27) capable of cooperating with a corresponding annular recess (21b) provided on said third pivot pin (21).

8. A device according to claim 6, characterized in that the cylindrical seat (26) for the third pivot pin (21) is substantially parallel to the cylindrical seat (25) for the first pivot pin (6).

9. A device according to claim 6 characterized in that the third pivot pin (21) is attached to one of the extremities of an auxiliary wiper arm (22).

10. A device according to claim 1 characterized in that the body (4,19) of the device is made of an appropriate plastic material.

* * * * *